US012598530B2

(12) United States Patent
Raghavendra

(10) Patent No.: US 12,598,530 B2
(45) Date of Patent: Apr. 7, 2026

(54) METHOD FOR MOBILITY MANAGEMENT ENTITY DATA CENTER SWITCHOVER AND SYSTEM FOR USING THE SAME

(71) Applicant: Rakuten Symphony, Inc., Tokyo (JP)

(72) Inventor: Raghavendra, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 233 days.

(21) Appl. No.: 18/381,173

(22) Filed: Oct. 18, 2023

(65) Prior Publication Data

US 2025/0133465 A1      Apr. 24, 2025

(51) Int. Cl.
| | |
|---|---|
| *H04W 36/30* | (2009.01) |
| *H04W 8/08* | (2009.01) |
| *H04W 28/02* | (2009.01) |
| *H04W 76/18* | (2018.01) |

(52) U.S. Cl.
CPC ........... *H04W 36/305* (2018.08); *H04W 8/08* (2013.01); *H04W 28/0226* (2013.01); *H04W 76/18* (2018.02)

(58) Field of Classification Search
CPC . H04W 36/305; H04W 8/08; H04W 28/0226; H04W 76/18; H04W 36/12
See application file for complete search history.

(56) References Cited

U.S. PATENT DOCUMENTS

| | | | | |
|---|---|---|---|---|
| 2017/0164135 | A1* | 6/2017 | Kodaypak | H04W 4/70 |
| 2023/0048805 | A1* | 2/2023 | Kumar | H04W 60/005 |
| 2023/0102852 | A1* | 3/2023 | Andrae | G06F 9/5072 |
| | | | | 370/331 |
| 2023/0132987 | A1* | 5/2023 | Ahmad | H04L 41/0803 |
| | | | | 709/223 |

FOREIGN PATENT DOCUMENTS

EP          3001728 A1 *   3/2016   ............ H04W 8/065

* cited by examiner

*Primary Examiner* — Sun Jong Kim
(74) *Attorney, Agent, or Firm* — HAUPTMAN HAM, LLP

(57) ABSTRACT

A system includes a non-transitory computer readable medium configured to store instructions thereon; and a processor connected to the non-transitory computer readable medium. The processor is configured to execute the instructions for configuring a first service type mobility management entity corresponding to a first predetermined service at a location and connectable to first user equipment subscribed for the first predetermined service, configuring a second service type mobility management entity corresponding to a second predetermined service different from the first predetermined service at the location and connectable to second user equipment subscribed for the second predetermined service, and performing, in response to determining that the first service type mobility management entity fails to connect to the first user equipment, a switchover of a connection for the first user equipment to connect to a different first service type mobility management entity at a different location.

12 Claims, 9 Drawing Sheets

900

908

Memory 904 computer program code 906 instructions 907

I/O 910

Processor 902

Network Interface 912

Network 914

METHOD FOR MOBILITY MANAGEMENT ENTITY DATA CENTER SWITCHOVER AND SYSTEM FOR USING THE SAME

BACKGROUND

Telecommunication industry has experienced significant growth in recent years, driving by the increasing demand for high-speed connectivity and real-time communication. Telecommunication service providers attract customers by improve their network infrastructure and service delivery. Mobility Management Entity (MME) data center serves a central hub for managing network resources and providing operational support. MME data center downtime can lead to significant damage to a mobile network operator's reputation and customer satisfaction. When a MME data center stops working, a switchover to another MME data center is usually performed in order to ensure a stable network connection.

SUMMARY

In some embodiments, a system includes a non-transitory computer readable medium configured to store instructions thereon; and a processor connected to the non-transitory computer readable medium. The processor is configured to execute the instructions for configuring a first service type mobility management entity corresponding to a first predetermined service at a location, the first service type mobility management entity connectable to first user equipment subscribed for the first predetermined service. The processor is further configured to execute the instructions for configuring a second service type mobility management entity corresponding to a second predetermined service different from the first predetermined service at the location, the second service type mobility management entity connectable to second user equipment subscribed for the second predetermined service. The processor is further configured to execute the instructions for performing, in response to determining that the first service type mobility management entity fails to connect to the first user equipment, a switchover of a connection for the first user equipment to connect to a different first service type mobility management entity at a different location.

In some embodiments, a method includes configuring a first service type mobility management entity corresponding to a first predetermined service at a location, the first service type mobility management entity connectable to first user equipment subscribed for the first predetermined service. The method further includes configuring a second service type mobility management entity corresponding to a second predetermined service different from the first predetermined service at the location, the second service type mobility management entity connectable to second user equipment subscribed for the second predetermined service. The method further includes performing, in response to determining that the first service type mobility management entity fails to connect to the first user equipment, a switchover of a connection for the first user equipment to connect to a different first service type mobility management entity at a different location.

In some embodiments, a non-transitory computer readable medium configured to store instructions for causing a processor executing the instructions to implement a method. The instructions cause the processor to configure a first service type mobility management entity corresponding to a first predetermined service at a location, the first service type mobility management entity connectable to first user equipment subscribed for the first predetermined service. The instructions further cause the processor to configure a second service type mobility management entity corresponding to a second predetermined service different from the first predetermined service at the location, the second service type mobility management entity connectable to second user equipment subscribed for the second predetermined service. The instructions further cause the processor to perform, in response to determining that the first service type mobility management entity fails to connect to the first user equipment, a switchover of a connection for the first user equipment to connect to a different first service type mobility management entity at a different location.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
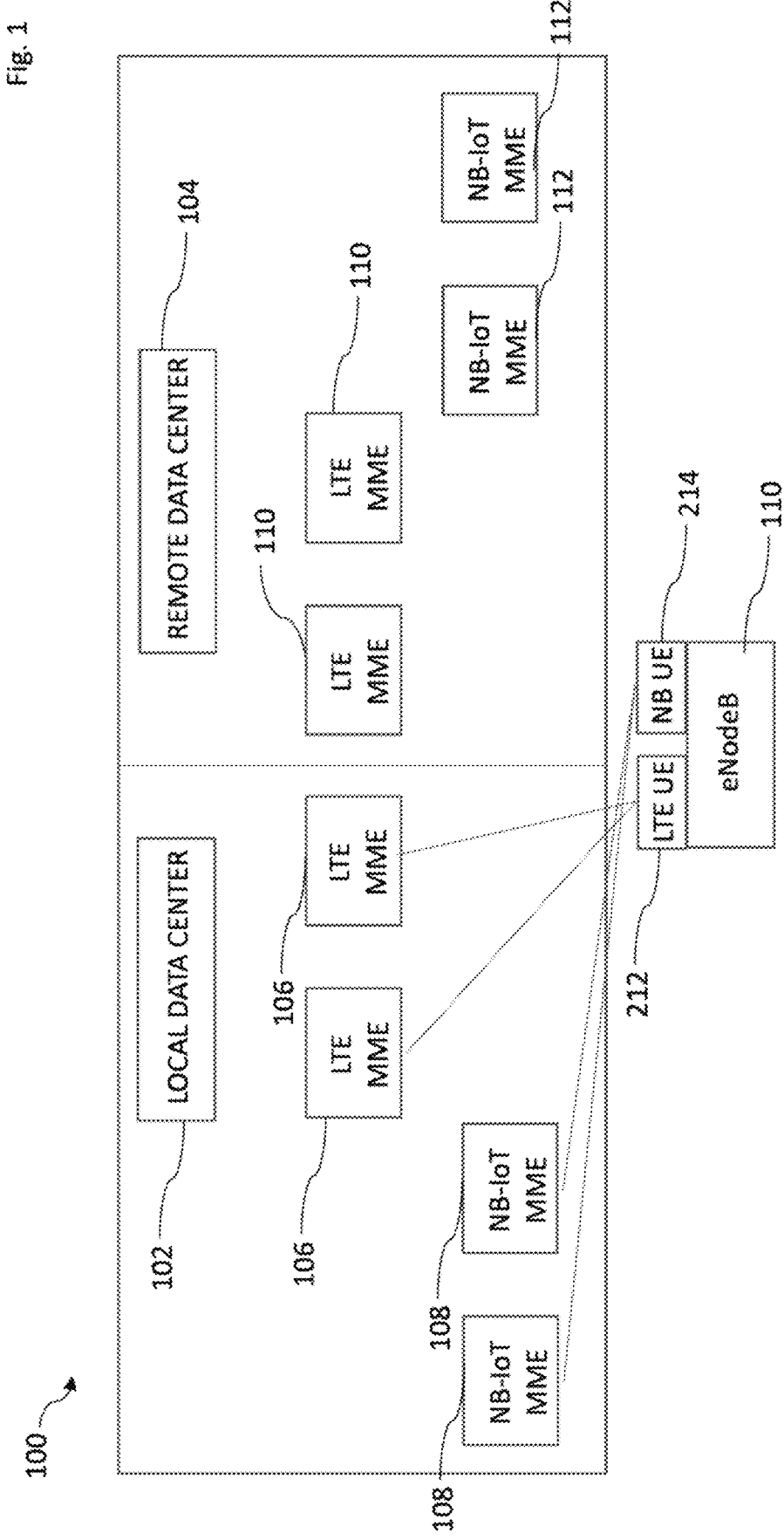
FIG. 1 is a schematic diagram of a MME data center deployment for service type based MMEs in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Mobility Management Entity (MME) is a core network element that handles connections between user equipment (UE) and base stations in Long Term Evolution (LTE) network or 5G network. In some deployment, there are Active (primary) MMEs located in a local data center and Standby (redundant) MMEs located in a remote data center. When a connection to one MME in the local data center fails, a geographic locational MME switchover mechanism is implemented to help ensure that a connection to another MME in the remote data center is made. Such MME switchover mechanism is configured to ensure seamless connectivity and reliability of the network.

With the development of Narrowband Internet of Things (NB-IoT) technology, a network is able to support multiple types of MMEs based on service types, e.g., MME for LTE only and MME for NB-IoT only. However, the geographic locational MME switchover mechanism would not work efficiently when multiple service type MMEs are used.

As per the geographic locational MME switchover mechanism, when all MMEs (Active MME) from a local data center get unreachable (irrespective of service type), then only Active→Standby Data Center (DC) Switchover is performed. However in some instances, due to an operator maintenance activity or a local LAN failure or a MME software failure, a specific service type MME may be impacted in the local data center. In such a case, implementing the geographic locational MME switchover mechanism would result in the following situations.

When all "Active" MMEs related to LTE Service Type are unreachable, NB-IoT Service Type MMEs may still be reachable. Hence, Active→Standby DC switchover will not be performed. No further LTE attach would be possible for new LTE users, not having Serving-Temporary Mobile Subscriber Identity (S-TMSI)/Globally Unique MME Identifier (GUMMEI) and will be using Network Node Selection Function (NNSF) to select MME until (i) all "Active" MMEs related to NBIOT Service Type are also unreachable (DC Switchover being performed) and (ii) any one of "Active" MMEs related to LTE Service Type gets reachable.

When all "Active" MME's related to NB-IoT Service Type are unreachable, LTE Service Type MMEs may still be reachable. Hence, DC Switchover will not be performed. No further NB-IoT attach would be possible for new NB-IoT users, not having S-TMSI/GUMMEI and will be using NNSF to select MME until (i) all "Active" MMEs related to LTE Service Type are also unreachable. (DC Switchover being performed) and (ii) any one of "Active" MMEs related to NBIOT Service Type gets reachable.

As per the geographic locational MME switchover mechanism, when any one of the MMEs (Active MMEs) from the local data center gets reachable (irrespective of service type), then Standby→Active DC Switchover will be performed. However sometimes only a specific service type MME may get reachable in the local data center. In such a case, implementing the geographic locational MME switchover mechanism would result in the following situations.

When any one of the "Active" MMEs related to LTE Service Type becomes reachable, NB-IoT Service Type MMEs from the local DC is not reachable in some instances. As DC Switchover would be performed, hence no further NB-IoT attach would be possible for new NB-IoT users, not having S-TMSI/GUMMEI and will be using NNSF to select MME, until any one of "Active" MMEs related to NB-IoT Service Type also becomes reachable.

When any one of the "Active" MMEs related to NB-IoT Service Type gets reachable, LTE Service Type MMEs from the local DC is not reachable, in some instances. As DC Switchover would be performed, hence no further LTE attach would be possible for new LTE users, not having S-TMSI/GUMMEI and will be using NNSF to select MME, until any one of "Active" MMEs related to LTE Service Type also gets reachable.

For the reasons discussed above, the geographic locational MME switchover mechanism would not work efficiently when multiple service type MMEs are used.

In accordance with some embodiments described in the disclosure, a system implementing a DC switchover algorithm is able to separate MMEs to service type based MMEs and performs a DC switchover for service type based MMEs.

FIG. 1 is a schematic diagram of a MME data center deployment in accordance with some embodiments. A network 100 includes a local data center 102 and a remote data center 104 at a different location from the local data center 102. The local data center includes primary MMEs 106 and 108, and the remote data center 104 includes redundant MMEs 110 and 112. In some instances, the primary MMEs 106 are configured as active MMEs and the redundant MME 108 are configured as standby MMEs. In some embodiments, the active MMEs handles user equipment signaling and user data transfer, while the standby MMEs are ready to take over these functions in the event of a failure or maintenance outage. The number of MMEs 106, 108, 110, and 112 in the drawings for illustration purpose only. In some embodiments, the number of MMEs is different from the number of MMEs shown in the drawings.

An eNodeB (evolved NodeB) 110 is a base station that communicates directly with user equipment (UE) in a network. According to some embodiments related to FIG. 1, the eNodeB 110 communicates with LTE UE 212 and NB UE 214. LTE UE 212 is user equipment handling LTE network service, and NB UE 214 is user equipment handling narrowband network service, such as NB-IoT network service. The eNodeB 110 also communicates with other core network components via an interface called S1 interface. In some instances, the eNodeB 110 communicates with more than one MME for load balancing and redundancy reasons in a network. In some embodiments, through the S1 interface, the eNodeB is able to communicate with several core network components such as active MMEs 106 and standby MMEs 108.

A system in accordance with some embodiments described in the disclosure is provided to implement a DC switchover algorithm which configures the MMEs 106, 108, 110, and 112 based on network service types. In some embodiments, the network service types include, but not limited to, a wideband service such as LTE or 5G, and a narrowband service such as NB-IoT or Long-Term Evolution for Machines (LTE-M). The system separates MMEs based on their corresponding service types. In some embodiments, the system separates the active MMEs at the local data center 102 into LTE MMEs 106 and NB-IoT MMEs 108. Further, the system separates the standby MMEs at the remote data center 104 into LTE MMEs 110 and NB-IoT MMEs 112.

In some embodiments, the LTE MMEs 106 and LTE MMEs 110 are only connectable to LTE UE 212 for LTE network service, and the NB-IoT MME 108 and NB-IoT MME 112 are only connectable to NB UE 214 for NB-IoT service. In other words, LTE UE 212 is able to connect to LTE MME 106 or LTE MME 110 through eNodeB 210 but is not able to connect to NB-IoT MME 108 or NB-IoT MME 112. Further, NB UE 214 is able to connect to NB-IoT MME 108 or NB-IoT MME 112 through eNodeB 210 but is not able to connect to LTE MME 106 or LTE MME 110.

According to some embodiments as shown in FIG. 1, all active MMEs 106 and 108 are reachable for connecting with user equipment. When the active LTE MMEs 106 are reachable, the system connects the active LTE MMEs 106 to LTE UE 212, and when the active NB-IoT MMEs 108 are reachable, the system connects the active NB-IoT MMEs 108 to NB UE 214. In some embodiments, only one of the active LTE MMEs 106 is reachable, the system enables LTE UE 212 to connect to the only one reachable active LTE MME 106. In some embodiments, only one of the active NB-IoT MMEs 108 is reachable, the system enables NB UE 214 to connect to the only one reachable active NB-IoT MME 108. In some embodiments, the system automatically connects an active MME to a corresponding service type UE. In some embodiments, the system connects an active MME to a corresponding service type UE in response to a request received from an external device.

According to some embodiments, the system configures the LTE MMEs 106, LTE MMEs 110, the NB-IoT MME 108, and NB-IoT MME 112 as follows:

At least one MME 106 with "standby-mme" set to FALSE (Active) and Service Type as "LTE_ONLY", At least one MME 110 with "standby-mme" set to TRUE (Standby) and Service Type as "LTE_ONLY", At least one MME 108 with "standby-mme" set to FALSE (Active) and Service Type as "NB-IoT_ONLY", and At least one MME 112 with "standby-mme" set to TRUE (Standby) and Service Type as "NB-IoT_ONLY".

According to the configuration of the service type based MMEs 106, 108, 110, and 112, the system implementing a DC switchover algorithm is able to perform a service based segregation of DC switchover. In some embodiments, the DC switchover algorithm uses a "local_link_failure" flag. In some embodiments, the "local_link_failure" flag is used for a diagnosis of up/down status of all MMEs from the local data center. The "local_link_failure" flag is segregated as the flag "local_link_lte_failure" and the flag "local_link_nbiot_failure."

In some embodiments, in response to determining that all LTE MMEs 106 at the local data center 102 are down, i.e., all LTE MMEs 106 are not reachable for connecting to the corresponding LTE UE 212, the flag "local_link_lte_failure" is set as "true". Further, in response to determining that any one of LTE MMEs 106 and 108 at the local data center 102 comes back in service, i.e., any one of LTE MMEs 106 and 108 becomes reachable, the flag "local_link_lte_failure" is set from "true"→"false".

In some embodiments, in response to determining that all NB-IoT MMEs 108 at the local data center 102 are down, the flag "local_link_nbiot_failure" is set as "true". Further, in response to determining any one of NB-IoT MME 108 at the local data center 102 comes back in service, the flag "local_link_nbiot_failure" is set from "true"→"false".

In some embodiments, the system implementing the DC switchover algorithm is able to perform an active→standby DC switchover or a standby→active DC switchover.

In some embodiments, in response to any of the flags "local_link_lte_failure" and "local_link_nbiot_failure" being set from "false"→"true", the system is configured to perform an active→standby DC switchover corresponding to a respective service type, for instance, LTE service type or NB-IoT service type. The details of the active→standby DC switchover according to some embodiments are discussed in relation to FIGS. 2-4 and 7.

In some embodiments, in response to any of the flags "local_link_lte_failure" and "local_link_nbiot_failure" being set from "true"→"false", the system is configured to perform a standby→active DC switchover corresponding to a respective service type. The details of the standby→active DC switchover according to some embodiments are discussed in relation to FIGS. 5-6 and 8.

According to some embodiments, the system is able to generate a report of a result of the switchover and cause a transmitter to transmit the report to an external device, e.g., a server. The transmission of the report is performed automatically or in response to a request from a mobile network operator. In some embodiments, the report includes an audio or visual alert on the device. In some instances, the alert indicates that a switchover is completed or a switchover is failed. In some embodiments, the report is automatically displayed on a display of the device without user interaction. In some embodiments, the report includes details of which one of the active/standby MMEs is not reachable or reachable for providing the corresponding service.

In some embodiments, a report of the switchover indicates a switchover with details of the MMEs being switched. In response to receiving the report, the mobile network operator issues instructions for analyzing the report generated by the system to determine a reason of the switchover. In some embodiments, the system is able to perform additional tests and diagnostics to identify any issues related to the switchover.

In some embodiments, in response to a determination that a failed switchover impacts customers, the system is able to generate a message to the user equipment of the customers to inform the issue and provides updates on the status of the network service. This helps to manage customer expectations and minimize the impact of the issue.

In accordance with some embodiments described in the disclosure, the system is able to separate MMEs to service type based MMEs and performs a DC switchover that is specific to service type based MMEs. In some embodiments, in response to determining that an active MME related to a certain service type is down, the system performs an active→standby switchover corresponding to the service type while maintaining a connection of a different active MME related to a different service type unchanged. In some embodiments, in response to determining that the active MME related to the certain service type is back up in service, the system performs a standby→active switchover corresponding to the service type while maintaining a connection of a different standby MME related to a different service type unchanged. In such cases, UE related to the respective service type is able to primarily connect to the active MME in the local data center which is geographically nearer to the UE hence less latency compared with the remote data center such that the efficiency in maintaining the connectivity and reliability of the network is improved or customer satisfaction is also maintained or improved. Further the system according to some embodiments allows a mobile network operator to deploy MMEs from vendors that only provide one type of service such as NB-IoT at a low cost, so as to reduce operating expense as well as providing service specific geographic locational MME resiliency support.

Figure 2:
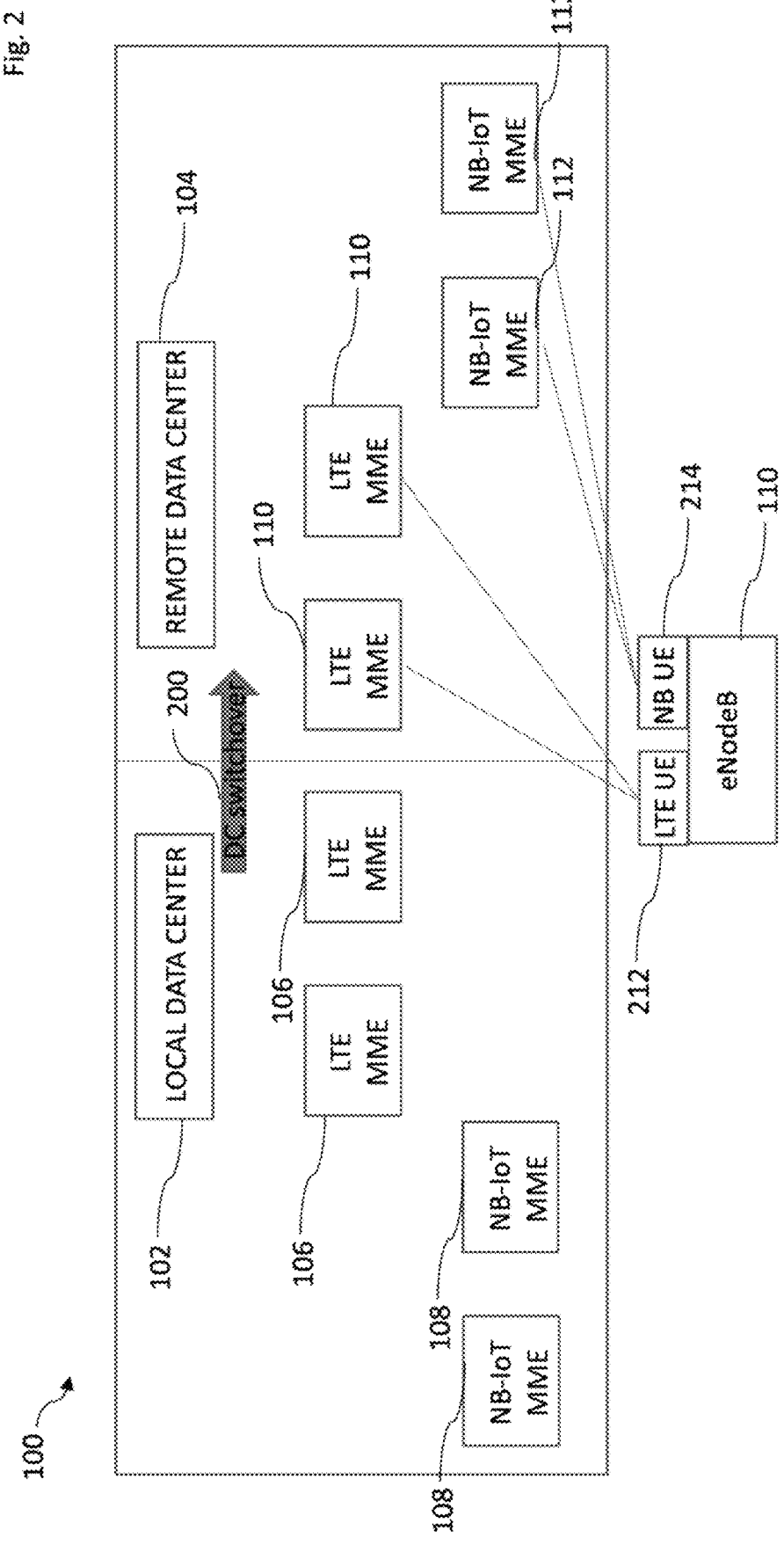
FIG. 2 is a schematic diagram of an Active (local)→Standby (remote) data center switchover for both LTE and NBIOT service in accordance with some embodiments.

FIG. 2 is a schematic diagram of an Active (local)→Standby (remote) data center switchover for both LTE and NBIOT service in accordance with some embodiments.

According to some embodiments as shown in FIG. 2, in the network 100, all active MMEs 106 and 108 at the local data center 102 are not reachable. That is, all active MMEs 106 and 108 fail to connect to the respective service type UE 212 and 214. In response to determining that the active LTE MMEs 106 and active NB-IoT MMEs 108 at the local data center 102 fail to connect to LTE UE 212 and NB UE 214, respectively, a data center (DC) switchover (active→standby DC switchover) 200 is triggered, that is, the system performs a switchover of a connection for the LTE UE 212 and NB-IoT UE 214 to connect to standby LTE MMEs 110 and standby LTE MMEs 112 at the remote data center 104, respectively.

In some embodiments, the system performs an active→standby DC switchover 100 even if only one of the standby LTE MMEs 110 is reachable, so as to allows LTE UE 212 to connect to the only one reachable standby LTE MME 110. In some embodiments, the system performs an active→standby DC switchover 200 even if only one of the standby NB-IoT MMEs 112 is reachable, so as to allows NB-IoT UE 214 to connect to the only one reachable standby NB-IoT MME 112. In such cases, the connectivity and reliability of the network is maintained therefore a user's satisfaction is improved.

In some embodiments, the eNodeB 110 selects a MME on its own when no information about a previously connected MME is available. In some embodiments, this functionality is performed mainly by "NAS Node Selection Function" (NNSF), located in the eNodeB 110 to determine an MME association of the UE. NNSF functionality relies on the auto learned/configured load balancing parameters to perform MME selection during Radio Resource Control (RRC) Connection Establishment procedure.

When user equipment provides neither "S-Temporary Mobile Subscriber Identity (S-TMSI)" in "RRC Connection Request" nor "Registered MME (R-MME) Information Element (IE) (without Public Land Mobile Network Identity (PLMN ID))" in "RRC Connection Setup Complete" 3GPP RRC message, eNodeB NNSF functionality is used to select an MME based on the DC switchover algorithm implemented by the system according to some embodiments.

According to some embodiments, the system, which implements the DC switchover algorithm, enables an existing or new LTE user equipment to connect to any of the LTE MMEs 110 at the remote data center 104 and enables an existing or new NB-IoT user to connect to any of the NB-IoT MMEs 112 at the remote data center 104. In some embodiments, LTE MMEs 110 and NB-IoT MMEs 112 are automatically connected to the corresponding existing or new LTE user equipment. In some embodiments, LTE MMEs 110 and NB-IoT MMEs 112 are connected to the corresponding existing or new LTE user equipment in response to a request received from an external device.

Figure 3:
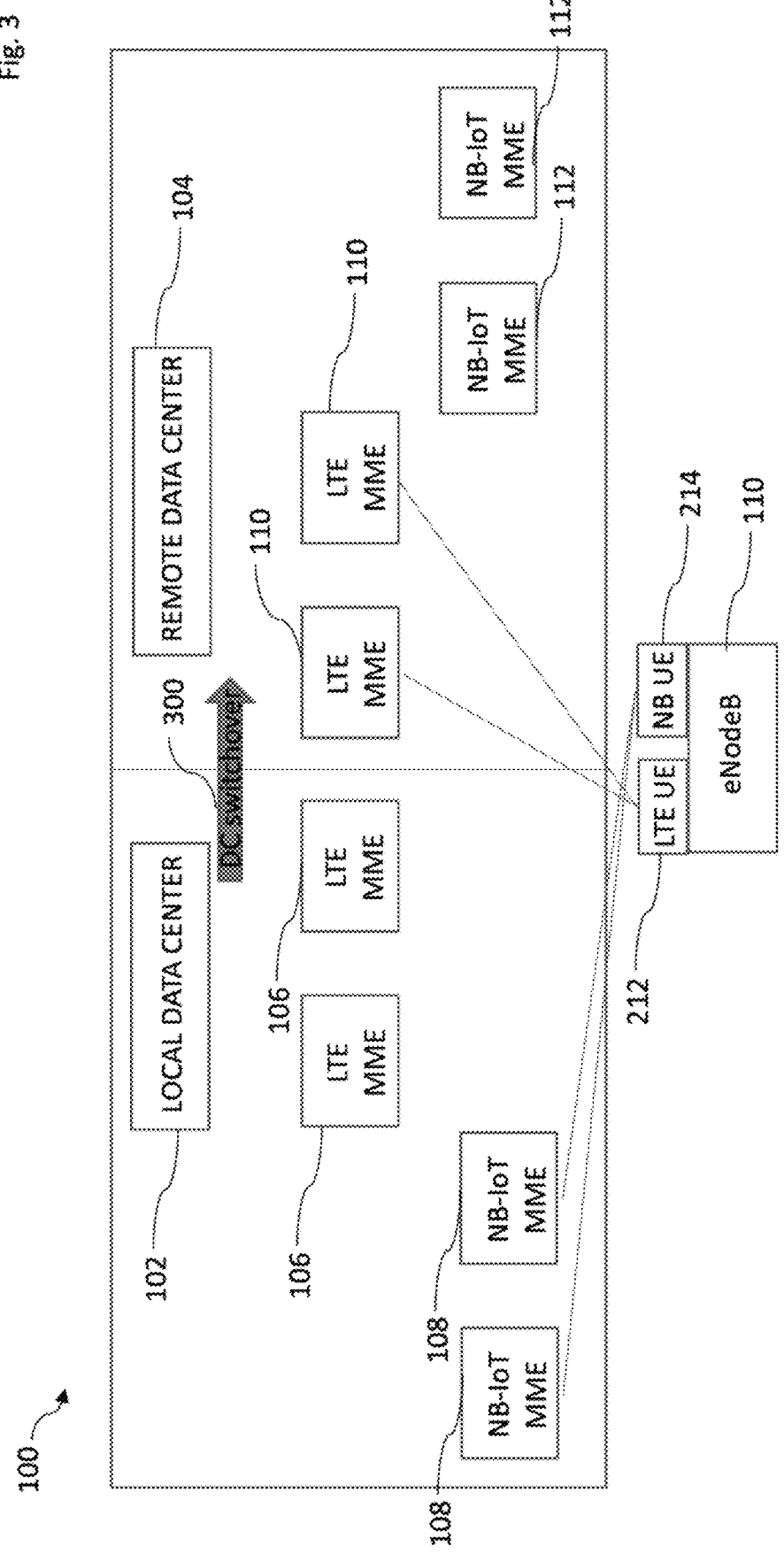
FIG. 3 is a schematic diagram of an Active (local)→Standby (remote) data center switchover for only LTE service with some embodiments.

FIG. 3 is a schematic diagram of an Active (local)→Standby (remote) data center switchover for only LTE service in accordance with some embodiments.

According to some embodiments as shown in FIG. 3, in the network 100, all active LTE MMEs 106 at the local data center 102 are not reachable. That is, all active LTE MMEs 106 for LTE service fail to connect to the LTE UE 212.

In response to determine that all active LTE MMEs 106 at the local data center 102 fail to connect to the LTE UE 212, a data center switchover (active→standby DC switchover) 300 is triggered, that is, the system performs a switchover of a connection for the LTE UE 212 to connect to standby LTE MMEs 110 at the remote data center 104. The active→standby DC switchover 300 is performed for LTE service type only so that the NB-IoT MMEs 108 at the local data center 102 remain connected with the NB UE 214. In such a case, current or new NB-IoT users (e.g., NB UE) are allowed to connect to the NB-IoT MME 108 at the local data center 102 which provides less latency compared to the remote data center 104. In some embodiments, the system connects the current or new NB UE automatically with the NB-IoT MME 108. In some embodiments, the system connects the current or new NB UE in response to receiving a request from an external device. Thus, a connection for NB UE to an active NB-IoT MME at the local data center would not be impacted by a connection failure of other active MMEs at the local data center.

For current LTE users, the system, which performs the active→standby DC switchover 300, enables the current LTE UE 212 to connect to the standby LTE MMEs 110 at the remote data center 104. For new LTE users, when new UE provides neither S-TMSI nor registered MME IE, eNodeB NNSF functionality is used to select an MME from the standby LTE MMEs 110 at the remote data center 104 based on the DC switchover algorithm implemented by the system according to some embodiments.

Figure 4:
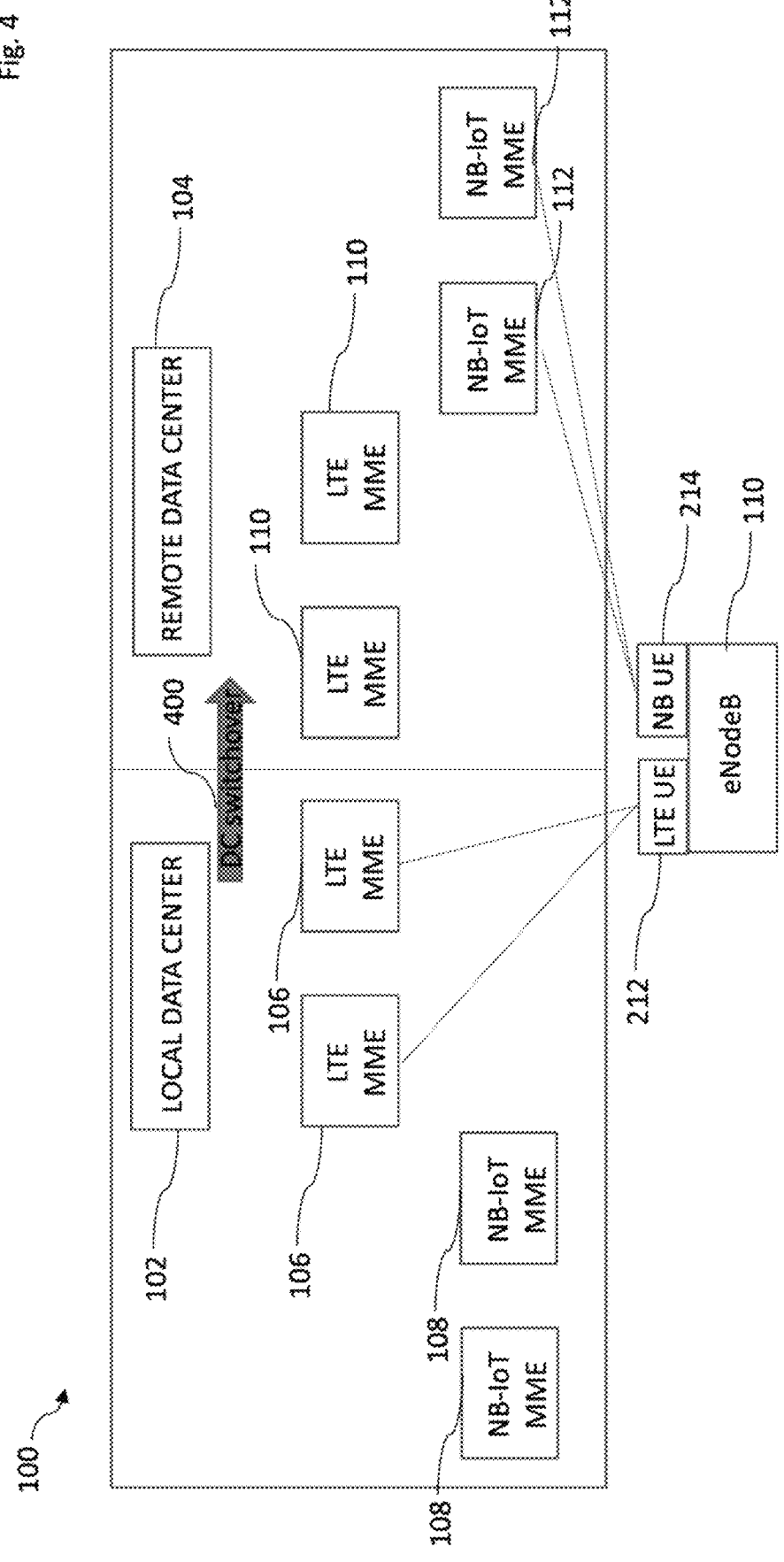
FIG. 4 is a schematic diagram of an Active (local)→Standby (remote) data center switchover for only NBIOT service in accordance with some embodiments.

FIG. 4 is a schematic diagram of an Active (local)→Standby (remote) data center switchover for only NBIOT service in accordance with some embodiments.

According to some embodiments as shown in FIG. 4, in the network 100, all active NB-IoT MMEs 108 at the local data center 102 are not reachable. That is, all active MMEs 108 for NB-IoT service types fail to connect to the NB UE 214.

In response to determining that all active NB-IoT MMEs 108 at the local data center 102 fail to connect to the NB-IoT UE 214, a data center switchover (active→standby DC switchover) 400 is triggered, that is, the system performs a switchover of a connection for the NB UE 214 to connect to standby NB-IoT MMEs 112 at the remote data center 104. The active→standby DC switchover 400 is performed for NBIOT service type only so that the LTE MMEs 106 at the local data center 102 remain connected with the LTE UE 214. In such a case, current or new LTE user equipment are allowed to connect to the LTE MME 106 at the local data center 102 which provides less latency compared to the remote data center 104. In some embodiments, the system connects the current or new LTE user equipment automatically with the LTE MME 106. In some embodiments, the system connects the current or new LTE user equipment in response to receiving a request from an external device. Thus, a connection for the current or new LTE user equipment to an active LTE MME at the local data center would not be impacted by a connection failure of other active MMEs at the local data center.

For current NB-IoT users, the system, which performs the active→standby DC switchover 400, enables the standby NB-IoT MMEs 112 at the remote data center 104 to connect to NB UE 214. For new NB-IoT users, when new UE provides neither S-TMSI or registered MME IE, eNodeB NNSF functionality is used to select an MME from the standby NB-IoT MMEs 112 at the remote data center 104 based on the DC switchover algorithm implemented by the system according to some embodiments.

Figure 5:
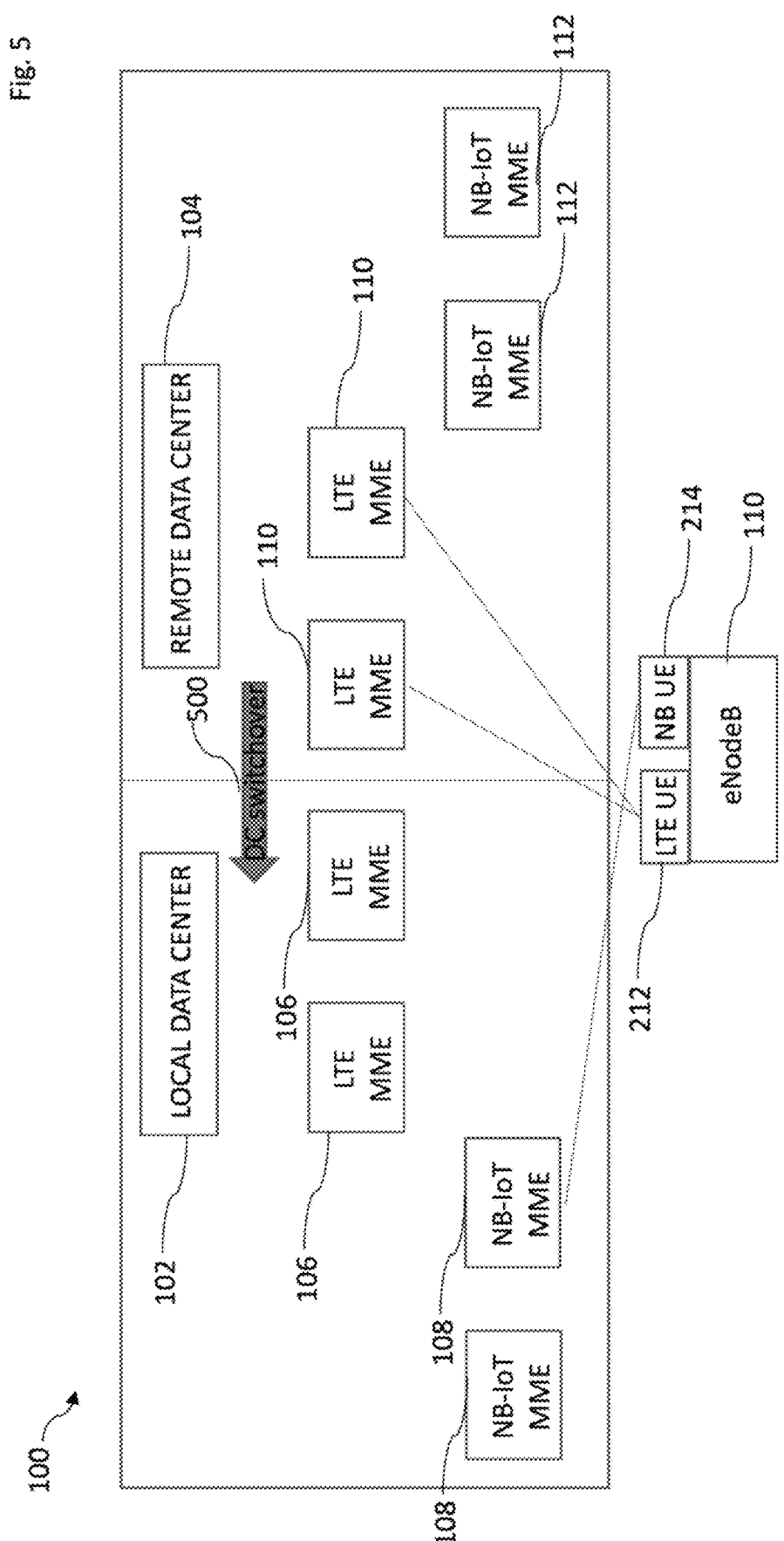
FIG. 5 is a schematic diagram of a Standby (remote)→Active (local) data center switchover for only NBIOT service in accordance with some embodiments.

FIG. 5 is a schematic diagram of a Standby (remote)→Active (local) data center switchover for only NBIOT service in accordance with some embodiments. FIG.

6 is a schematic diagram of a Standby (remote)→Active (local) data center switchover for only LTE service in accordance with some embodiments. According to some embodiments related to FIGS. 5-6, the system performs a standby→active DC switchover in response to determining that any one of the active LTE MMEs 106 and active NB-IoT MMEs 108 at the local data center 102 becomes reachable for connection to a corresponding service type UE.

In some embodiments related to FIG. 5, in response to a determination that one of the active NB-IoT MMEs 108 at the local data center 102 becomes reachable, the system performs a standby→active DC switchover 500 of a connection for the NB UE 214 to connect to the reachable active NB-IoT MME 108 at the local data center. In some embodiment, even if another active NB-IoT MMEs is not reachable, the system still performs the standby→active DC switchover 500. In such a case, current or new NB-IoT users equipment (e.g., NB UE) are allowed to connect to the NB-IoT MME 108 at the local data center 102 which provides less latency compared to the remote data center 104.

For current LTE users, the system, which performs the standby→active DC switchover 500, maintains the connection between the standby LTE MMEs 110 at the remote data center 104 and LTE UE 212, because the standby→active DC switchover 500 does not perform for the LTE service type. For new LTE users, when new UE provides neither S-TMSI or registered MME IE, eNodeB NNSF functionality is used to select an MME from the standby LTE MMEs 110 at the remote data center 104 based on the DC switchover algorithm implemented by the system according to some embodiments.

Figure 6:
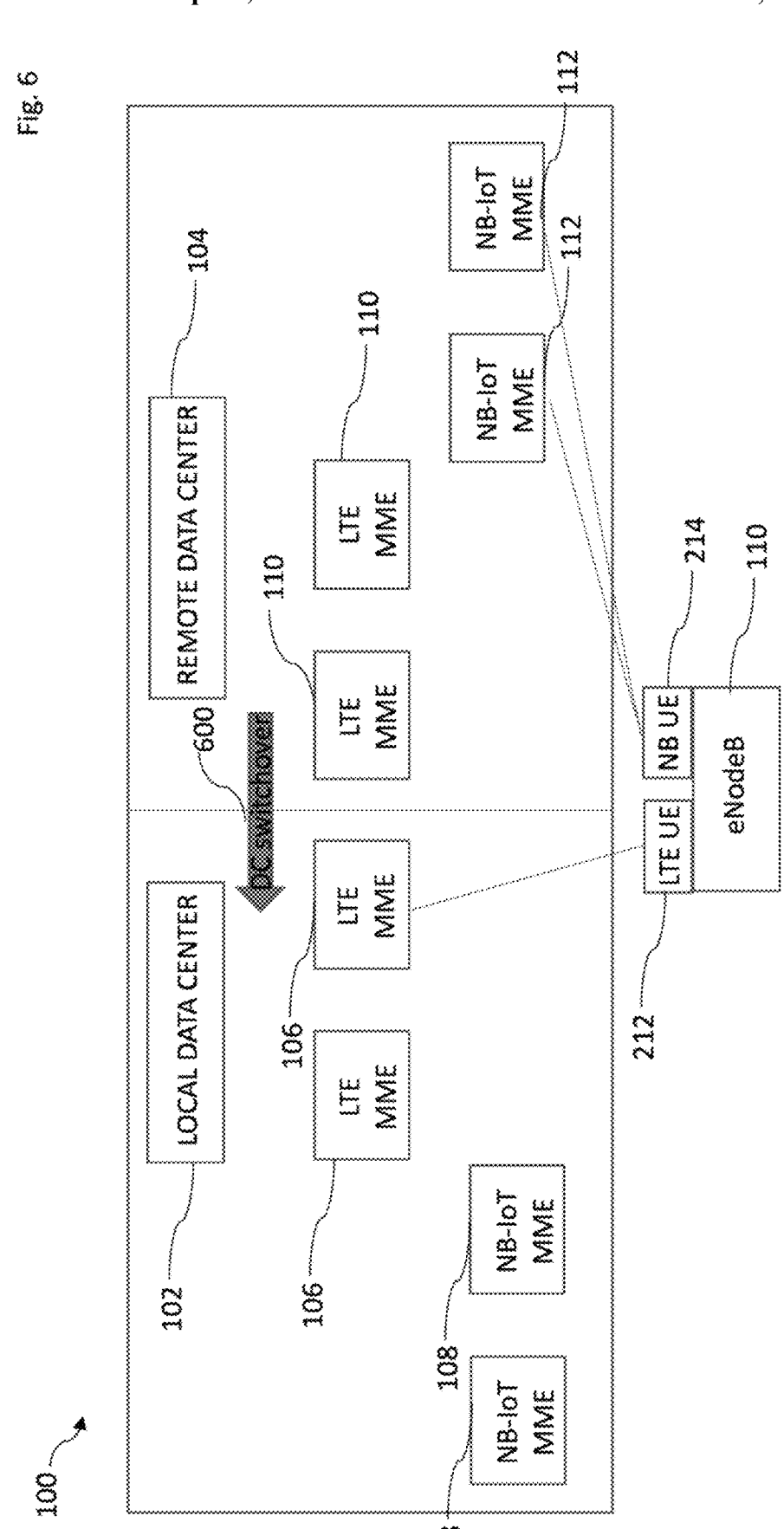
FIG. 6 is a schematic diagram of a Standby (remote)→Active (local) data center switchover for only LTE service in accordance with some embodiments.

In some embodiments related to FIG. 6, when the system determines that one of the active LTE MMEs 106 at the local data center 102 becomes reachable, the system performs a standby→active DC switchover 600 of a connection for the LTE UE 212 to connect to the reachable active LTE MME 106 at the local data center 102.

For current NB-IoT users, the standby NB-IoT MMEs 112 at the remote data center 104 are connected with NB UE 214, because the standby→active DC switchover 600 does not perform for the NB-IoT service type. For new NB-IoT users, when new UE provides neither S-TMSI or registered MME IE, eNodeB NNSF functionality is used to select an MME from the standby NB-IoT MMEs 112 at the remote data center 104 based on the DC switchover algorithm implemented by the system according to some embodiments.

The DC switchover algorithm implemented by the system according to some embodiments is not limited to the above discussed LTE and NB-IoT service types. In some embodiments, a modified DC switchover algorithm is implemented by the system for LTE-M service type. In some embodiments, MMEs include multiple service type based MMEs, such as, but not limited to, LTE MMEs, NB-IoT MMEs, and LTE-M MMEs. In some embodiments, MMEs based on more than two service types are configured in a local data center and a remote center. In some embodiments, MMEs based on a single service type are configured in a local data center and a remote center. For instances, all MMEs in a local data center are MMEs configured for LTE service only.

In some embodiments, as to LTE-M service type, the system configures MMEs for LTE-M service as follows:

At least one MME with "standby-mme" set to FALSE (Active) and Service Type as "LTE-M_ONLY", and
At least one MME with "standby-mme" set to TRUE (Standby) and Service Type as "LTE-M_ONLY".

According to some embodiments, the modified DC switchover algorithm sets a flag "local_link_ltem_failure" corresponding to LTE-M service type.

In some embodiments, in response to determining that all LTE-M MMEs at a local data center are down, the flag "local_link_ltem_failure" is set as "true". Further, in response to determining that any one of LTE-M MMEs at the local data center comes back in service, the flag "local_link_ltem_failure" is set from "true"→"false".

In some embodiments, in response to the flag "local_link_ltem_failure" being set from "false"→"true", the system is configured to perform an active→standby DC switchover corresponding to the LTE-M service type. In other words, when LTE-M MMEs at the local data center are down, i.e., failed to connect to LTE-M UE, LTE-M MMEs at a remote data center are connected to corresponding LTE-M UE due to the active→standby DC switchover.

In some embodiments, in response to the flag "local_link_ltem_failure" being set from "true"→"false", the system is configured to perform a standby→active DC switchover corresponding to the LTE-M service type. That is, as long as one of the LTE-M MMEs at the local center becomes reachable for connection, the standby→active DC switchover is performed to cause the LTE-M UE to connect to the one LTE-M MME at the local data center.

Figure 7:
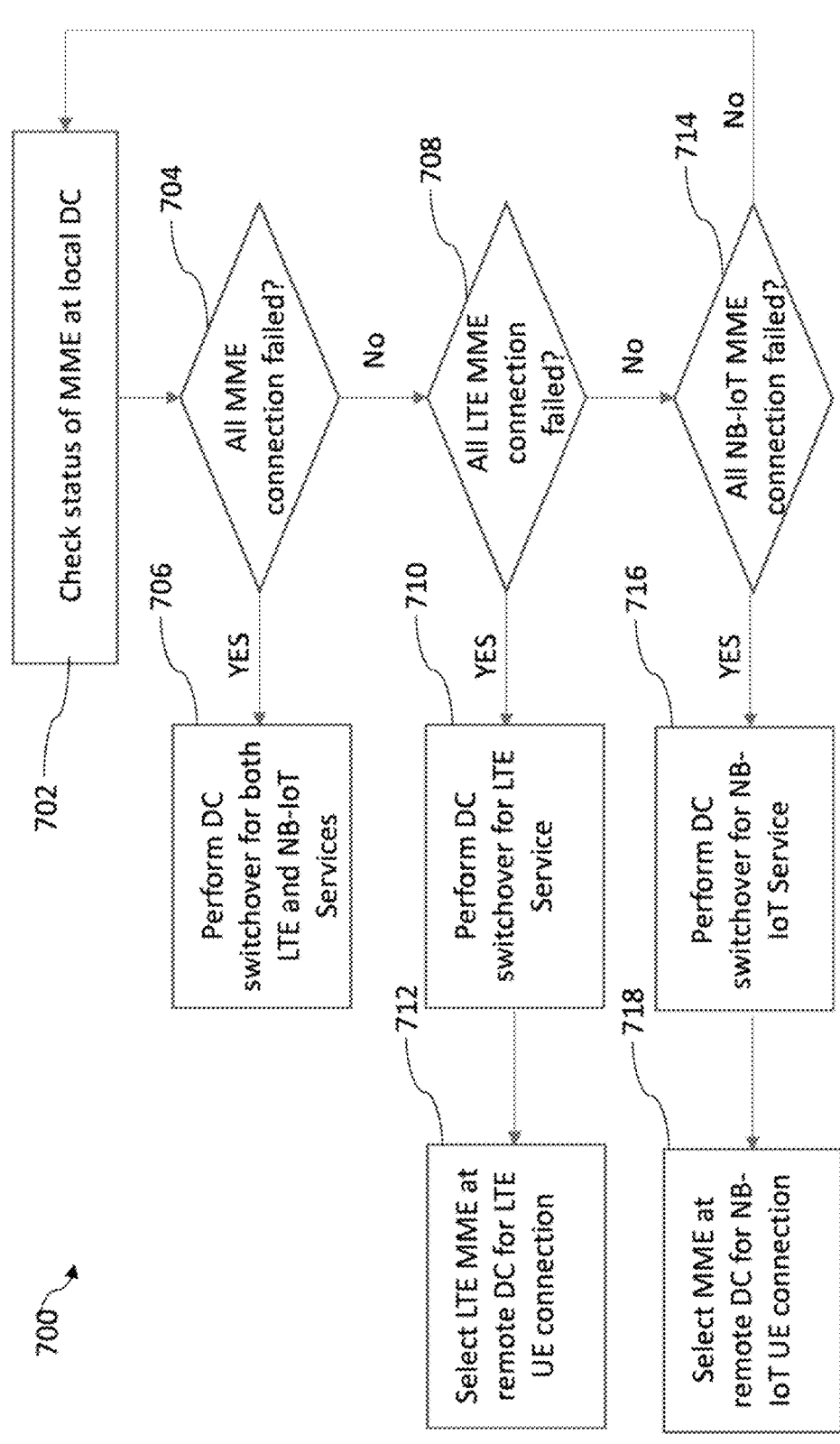
FIG. 7 is a flowchart of a method of performing an Active (local)→Standby (remote) data center switchover in accordance with some embodiments.

FIG. 7 is a flowchart of a method 700 of performing an Active (local)→Standby (remote) data center switchover in accordance with some embodiments. In some embodiments, the method 700 is usable by a network service provider of the network 100 (FIG. 1) or a mobile network operator operating the network 100 (FIG. 1), to provide a reliable connection for different service type users to use the corresponding network service. The method 700 is able to detect a status of a user equipment connection to MMEs. The method 700 is able to provide information to the network service provider or the mobile network operator by transmitting a result of a data center switchover to an external device, such as a server. This allows the service provider or the mobile network operator to make more informed decisions to maintain or improve the connectivity and reliability of the network. In some embodiments, the method 700 is implemented according to a DC switchover algorithm to perform one or more active→standby DC switchovers.

The method 700 includes operation 702 of checking a status of an MME at a local data center. In some embodiments, a local center includes different service type based MMEs, such as LTE MMEs or NB-IoT MMEs, as shown in FIG. 1 as an example. In some embodiments, the operation 702 checks connectivity of each of the MMEs at the local data center. In some embodiments, the operation 702 checks connectivity of only one service type based MMEs, e.g., checking the connectivity of LTE MMEs only.

In some embodiments, operation 702 is performed by one or more monitoring techniques to obtain the status of the MMEs at the local data center. For instance, a MME management algorithm is implemented to monitor the performance of the MMEs. As another example, MMEs are equipped with alarms that triggered in case of any abnormal behavior or connection failures. These alarms are sent to a network management system to take appropriate actions to ensure a smooth operation of the network.

In some embodiments, the method 700 includes operation 704 of determining whether all MMEs at the local data center lose connectivity, i.e., whether all MMEs at the local data center fail to connect to corresponding user equipment. In some embodiments, all MMEs, which are separated into different service types MMEs, such as LTE MMEs or NB-IoT MMEs, are considered in operation 704.

In some embodiments, the method 700 proceeds to operation 706 in response to determining that all MMEs at the local data center fail to connect to corresponding user equipment (i.e., YES at operation 704). Operation 706 performs a DC switchover for all MMEs at the local data center. In some embodiments, operation 706 performs an active→standby DC switchover for both LTE and NB-IoT services. In such a case, LTE MMEs and NB-IoT MMEs at the remote data center are enabled to connect to current or new user equipment for corresponding LTE and NB-IoT services.

In some embodiments, the method 700 proceeds to operation 708 in response to determining that not all MMEs at the local data center fail to connect to corresponding user equipment (i.e., NO at operation 704). Operation 708 determines whether all LTE MMEs for handling LTE service at the local data center lose connectivity, i.e., whether all LTE MMEs at the local data center fail to connect to LTE UE.

In some embodiments, the method 700 proceeds to operation 710 in response to determining that all LTE MMEs at the local data center fail to connect to LTE UE (i.e., YES at operation 708). In some embodiments, regardless the other service type MMEs (e.g., NB-IoT MMEs) at the local data center may be reachable or may not be reachable, operation 710 performs an active→standby DC switchover for LTE service only. In such a case, user equipment for a different network service type (e.g., NB-IoT) will keep on using the corresponding service type MMEs at the local data center without being switched to connect to a corresponding service type MME at the remote data center. For example, NB UE for NB-IoT service will remain connected to the local data center.

The method 700 proceeds from operation 710 to operation 712 in which a LTE MME at the remote data center is selected to connect to LTE UE. In some embodiments, operation 710 automatically selects one or more LTE MMEs at the remote data center to connect to the current LTE UE. In some embodiments, for new LTE UE, which are not having S-TMSI/Registered MME, operation 712 automatically selects a LTE MME from the remote data center. In some embodiments, the selection of LTE MME at the remote data center made for new LTE UE is performed upon receiving a request from an external device.

In some embodiments, the method 700 proceeds to operation 714 in response to determining that not all LTE MMEs at the local data center fail to connect to LTE UE (i.e., NO at operation 708). Operation 714 determines whether all NB-IoT MMEs at the local data center lose connectivity, i.e., whether all NB-IoT MMEs at the local data center fail to connect to NB UE.

In some embodiments, the method 700 proceeds to operation 716 in response to determining that all NB-IoT MMEs at the local data center fail to connect to NB UE (i.e., YES at operation 714). In some embodiments, regardless the other service type MMEs (e.g., LTE MMEs) at the local data center may be reachable or may not be reachable, operation 716 performs an active→standby DC switchover for NB-IoT service only.

The method 700 proceeds from operation 716 to operation 718 in which a NB-IoT MME at the remote data center is selected to connect to corresponding NB UE. In some embodiments, operation 718 automatically connects NB UE to the NB-IoT MME at the remote data center. In some embodiments, for new NB UE, which are not having S-TMSI/Registered MME, operation 716 automatically selects a NB-IoT MME from the remote data center. In some embodiments, the selection of NB-IoT MME at the remote data center made for new NB-IoT UE is performed upon receiving a request from an external device.

In some embodiments, in response to determining that not all NB-IoT MME at the local data center fail to connect to NB UE (i.e., NO at operation 714, the method 700 proceeds to operation 702 to check the status of the MMEs at the local data center again.

One of ordinary skill in the art would recognize that additional operations are included in method 700 in some embodiments. For example, in some embodiments, an operation of checking the connectivity of MMEs in the remote data center is included in the method 700. In some embodiments, at least one operation is omitted from the method 700. For example, in some embodiments, the operation 702 for checking the status of MMEs at the local data center is omitted from the method 700 when a status report has been received from a network performance monitoring system. In some embodiments, an order of operations of the method 700 is adjusted. For example, in some embodiments, operations 704, 708, and 714 are performed at the same time after checking the status of the MMEs at the local data center. As another example, any of operations 704, 708, and 714 is performed prior to another one of operations 704, 708, and 714 to trigger a corresponding DC switchover.

Figure 8:
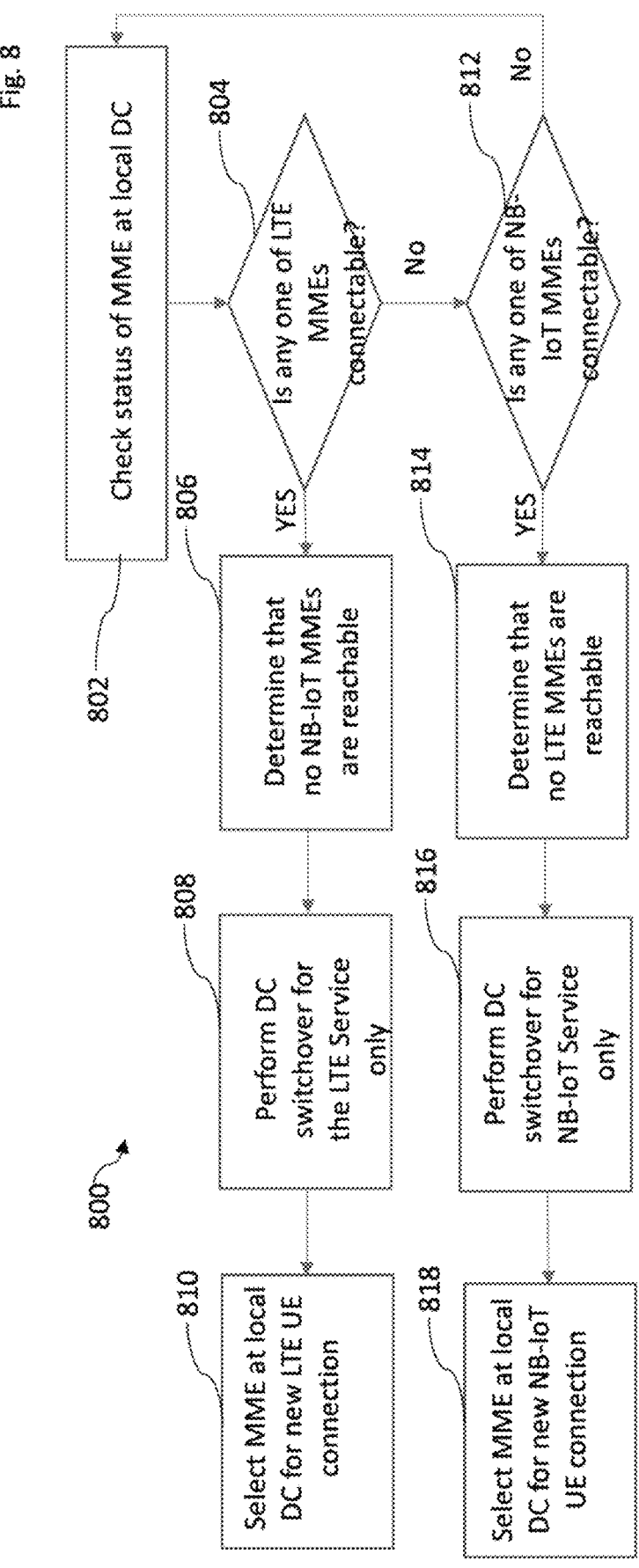
FIG. 8 is a flowchart of a method of performing a Standby (remote)→Active (local) data center switchover in accordance with some embodiments.

FIG. 8 is a flowchart of a method 800 of triggering a Standby (remote)→Active (local) data center switchover in accordance with some embodiments.

In some embodiments, the method 800 is usable by a network service provider of the network 100 (FIG. 1) or a mobile network operator operating the network 100 (FIG. 1), in order to provide a reliable connection for different service type users to use the corresponding network service. The method 800 is able to detect a status of a user equipment connection to MMEs. The method 800 is able to provide information to the service provider or the mobile network operator by transmitting a result of data center switchover to an external device, such as a server. This allows the service provider or the mobile network operator to make more informed decisions to maintain or improve the connectivity and reliability of the network. In some embodiments, the method 800 is implemented according to a DC switchover algorithm to perform one or more standby→active DC switchovers.

The method 800 includes operation 802 of checking a status of a MME at a local data center. The operation 802 is similar to operation 702 of the method 700. In some embodiments, a local center includes different service type based MMEs, such as LTE MMEs or NB-IoT MMEs, as shown in FIG. 1 as an example. In some embodiments, the operation 802 checks connectivity of each of the MMEs at the local data center. In some embodiments, the operation 802 checks connectivity of only one service type based MMEs, e.g., checking the connectivity of LTE MMEs only.

In some embodiments, operation 802 is performed by one or more monitoring techniques to obtain the status of the MMEs at the local data center. For instance, a MME management algorithm is implemented to monitor the performance of the MMEs. As another example, MMEs are equipped with alarms that triggered in case of any abnormal behavior or connection failures. These alarms are sent to a network management system to take appropriate actions to ensure a smooth operation of the network.

In some embodiments, the method 800 includes operation 804 of determining whether any one of LTE MMEs at the local data center becomes connectable, i.e., whether any of the LTE MMEs at the local data center is reachable for connecting to LTE UE. In some embodiments, operation 704 is not limited to determine MMEs for LTE service type only. In some embodiments, operation 704 determines whether any one of a different service type based MMEs becomes connectable, such as a narrowband service type, e.g., NB-IoT.

In some embodiments, the method 800 proceeds to operation 806 in response to determining that one of the LTE MMEs at the local data center becomes connectable (i.e., YES at operation 804). Operation 806 determines that none of the MMEs related to other services at the local data center is reachable. That is, if the MMEs related to other services (e.g., NB-IoT service) at the local data center are not reachable for connecting to the corresponding UE, operation 806 determines that none of the MMEs related to NB-IoT services at the local data center is reachable.

In some embodiments, the method 800 proceeds from operation 806 to operation 808. In some embodiments, operation 808 performs a standby→active DC switchover for LTE service only because operation 806 confirms that none of the MMEs related to other services at the local data center is reachable. In such a case, user equipment subscribed for a network service different from the LTE service will keep on using the corresponding service type MMEs at the remote data center. For example, if NB-IoT MMEs are configured in the remote data center, NB UE for NB-IoT service will remain connected to the NB-IoT MMEs at the remote data center.

The method 800 proceeds from operation 808 to operation 810 in which the LTE MME at the local data center which becomes connectable is selected to connect to LTE UE. In some embodiments, operation 810 selects the connectable LTE MME at the local data center to connect to the current LTE UE. In some embodiments, for new LTE UE, which are not having S-TMSI/Registered MME, operation 810 automatically selects the connectable LTE MME from the local data center. In some embodiments, the selection of LTE MME at the local data center made for new LTE UE is performed in operation 810 upon receiving a request from an external device.

In some embodiments, the method 800 proceeds to operation 812 in response to determining that none of the LTE MMEs at the local data center becomes connectable to LTE UE (i.e., NO at operation 804). Operation 812 determines whether any one of NB-IoT MMEs at the local data center is connectable, i.e., whether any one of NB-IoT MMEs at the local data center is reachable to connect to NB UE.

In some embodiments, the method 800 proceeds to operation 814 in response to determining that any one of NB-IoT MMEs at the local data center becomes connectable to LTE UE (i.e., YES at operation 812). Operation 814 determines that none of the MMEs related to other services at the local data center is reachable. That is, if the MMEs related to other services (e.g., LTE service) at the local data center are not reachable for connecting to the corresponding UE, operation 806 determines that none of the MMEs related to LTE services at the local data center is reachable.

In some embodiments, the method 800 proceeds from operation 814 to operation 816. Operation 816 performs a standby→active DC switchover for NB-IoT service only. In such a case, user equipment for a different network service type than NB-IoT service will keep on using the corresponding service type MMEs at the remote data center. For example, if LTE MMEs are configured in the remote data center, LTE UE for LTE service will remain connected to the remote data center.

The method 800 proceeds from operation 816 to operation 818 in which a NB-IoT MME at the local data center is selected to connect to corresponding NB UE. In some embodiments, operation 818 automatically connects NB UE to the NB-IoT MME at the local data center. In some embodiments, for new NB UE, which are not having S-TMSI/Registered MME, operation 818 automatically selects a NB-IoT MME from the local data center. In some embodiments, the selection of NB-IoT MME at the local data center made for new NB UE is performed upon receiving a request from an external device.

In some embodiments, in response to determining that none of the NB-IoT MME at the local data center becomes connectable to NB UE (i.e., NO at operation 812, the method 800 proceeds to operation 802 to check the status of the MMEs at the local data center again.

One of ordinary skill in the art would recognize that additional operations are included in method 800 in some embodiments. For example, in some embodiments, an operation of checking the connectivity of MMEs in the remote data center is included in the method 800. In some embodiments, at least one operation is omitted from the method 800. For example, in some embodiments, the operation 802 for checking the status of MMEs at the local data center is omitted from the method 800 when a status report has been received from a network performance monitoring system. In some embodiments, an order of operations of the method 800 is adjusted. For example, in some embodiments, operations 804 and 812 are performed at the same time after checking the status of the MMEs at the local data center. As another example, any of operations 804 and 812 is performed prior to the other one of operations 804 and 812 to trigger a corresponding DC switchover.

Figure 9:
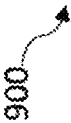
FIG. 9 is a block diagram of a system for implementing a service type based MME switchover in accordance with some embodiments.

FIG. 9 is a block diagram of a system 900 for implementing a service type based MME switchover in accordance with some embodiments.

System 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with manufacturing machines for producing the memory array. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in method 700 (FIG. 7) or method 800 (FIG. 8).

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the storage medium 904 stores the computer program code 906 such as a DC switchover algorithm configured to cause system 900 to perform a portion or all of the operations as described in method 700 (FIG. 7) or method 800 (FIG. 8). In some embodiments, the storage medium 904 also stores information for performing a portion or all of the operations as described in method 700 (FIG. 7) or method 800 (FIG. 8) as well as information generated during performing a portion or all of the operations as described in method 700 (FIG. 7) or method 800 (FIG. 8), such as a result of determination at operations 704, 708, and 714 in method 700 (FIG. 7) or a result of determination at operations 804 and 812 in method 800 (FIG. 8). In some embodiments, the storage medium 904 further stores a result of a DC switchover in method 700 (FIG. 7) or method 800 (FIG. 8).

In some embodiments, the storage medium 904 stores instructions 907 for interfacing with external devices. The instructions 907 enable processor 902 to generate and receive instructions readable by the external devices to effectively perform a portion or all of the operations as described in method 700 (FIG. 7) or method 800 (FIG. 8).

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, method 700 (FIG. 7) or method 800 (FIG. 8) is implemented in two or more systems 900, and information is exchanged between different systems 900 via network 914.

Supplemental Note 1

An aspect of this description relates to a system. The system includes a non-transitory computer readable medium configured to store instructions thereon; and a processor connected to the non-transitory computer readable medium. The processor is configured to execute the instructions for configuring a first service type mobility management entity corresponding to a first predetermined service at a location, the first service type mobility management entity connectable to first user equipment subscribed for the first predetermined service. The processor is further configured to execute the instructions for configuring a second service type mobility management entity corresponding to a second predetermined service different from the first predetermined service at the location, the second service type mobility management entity connectable to second user equipment subscribed for the second predetermined service. The processor is further configured to execute the instructions for performing, in response to determining that the first service type mobility management entity fails to connect to the first user equipment, a switchover of a connection for the first user equipment to connect to a different first service type mobility management entity at a different location.

Supplemental Note 2

In some embodiments, the processor of the Supplemental Note 1 is configured to execute the instructions for: in response to determining that the first and second service type mobility management entities fail to connect to the first and second user equipment, performing the switchover of the connection for the first user equipment to connect to the different first service type mobility management entity at the different location, and performing a second switchover of a connection for the second user equipment to connect to a different second service type mobility management entity at the different location.

Supplemental Note 3

In some embodiments, the processor of the Supplemental Notes 1 and 2 is configured to execute the instructions for: in response to determining that the first service type mobility management entity fails to connect to the first user equipment and receiving a request of connecting new first user equipment subscribed for the first predetermined service, selecting the different first service type mobility management entity at the different location to connect to the new first user equipment.

Supplemental Note 4

In some embodiments, the processor of any of Supplemental Notes 1-3 is configured to execute the instructions for: in response to determining that the first service type mobility management entity fails to connect to the first user equipment and the second service type mobility management entity remains connected to the second user equipment, performing the switchover of the connection for the first user equipment to connect to the different first service type mobility management entity at the different location while maintaining the connection between the second service type mobility management entity and the second user equipment to allow the second service type mobility management entity at the location to connect to new second user equipment.

Supplemental Note 5

In some embodiments, in response to a determination that the first and second service type mobility management entities at the location fail to connect to the first and second user equipment, respectively, the processor of any of Supplemental Notes 1-4 is configured to execute the instructions for: in response to determining that one of the first or second service type mobility management entities becomes connectable, performing a switchover of a connection for one of the first or second user equipment to connect to said one of the first service type mobility management entity or the second service type mobility management entity.

Supplemental Note 6

In some embodiments, in response to a determination that the first and second service type mobility management entities at the location fail to connect to the first and second user equipment, respectively, the processor of any of Supplemental Notes 1-5 is configured to execute the instructions for: in response to determining that the first service type mobility management entity becomes connectable and the second service type mobility management entity still fails to connect to the second user equipment, performing a switchover of a connection for the first user equipment to connect to the first service type mobility management entity while maintaining the connection between the different second service type mobility management entity at the different location and the second user equipment to allow the different second service type mobility management entity at the different location to connect to new second user equipment.

Supplemental Note 7

In some embodiments, the first service type mobility management entity of any of Supplemental Notes 1-6 is configured to handle the first predetermined service only, the first predetermined service including a wideband network service.

Supplemental Note 8

In some embodiments, the second service type mobility management entity of Supplemental Notes 1-7 is configured to handle the second predetermined service only, the second predetermined service including a narrowband network service.

Supplemental Note 9

In some embodiments, the processor of Supplemental Notes 1-8 is configured to execute the instructions for instructing a transmitter to transmit a result of the switchover to an external device.

Supplemental Note 10

An aspect of this description relates to a method. The method includes configuring a first service type mobility management entity corresponding to a first predetermined service at a location, the first service type mobility management entity connectable to first user equipment subscribed for the first predetermined service. The method further includes configuring a second service type mobility management entity corresponding to a second predetermined service different from the first predetermined service at the location, the second service type mobility management entity connectable to second user equipment subscribed for the second predetermined service. The method further includes performing, in response to determining that the first service type mobility management entity fails to connect to the first user equipment, a switchover of a connection for the first user equipment to connect to a different first service type mobility management entity at a different location.

Supplemental Note 11

In some embodiments, the method of Supplemental Note 10 further includes in response to determining that the first and second service type mobility management entities fail to connect to the first and second user equipment, performing the switchover of the connection for the first user equipment to connect to the different first service type mobility management entity at the different location, and performing a second switchover of a connection for the second user equipment to connect to a different second service type mobility management entity at the different location.

Supplemental Note 12

In some embodiments, the method of the Supplemental Notes 10-11 further includes in response to determining that the first and second service type mobility management entities fail to connect to the first and second user equipment, performing the switchover of the connection for the first user equipment to connect to the different first service type mobility management entity at the different location, and performing a second switchover of a connection for the second user equipment to connect to a different second service type mobility management entity at the different location.

Supplemental Note 13

In some embodiments, the method of any of the Supplemental Notes 10-12 further includes in response to determining that the first service type mobility management entity fails to connect to the first user equipment and receiving a request of connecting new first user equipment subscribed for the first predetermined service, selecting the different first service type mobility management entity at the different location to connect to the new first user equipment.

Supplemental Note 14

In some embodiments, the method of any of the Supplemental Notes 10-13 further includes in response to determining that the first service type mobility management entity fails to connect to the first user equipment and the second service type mobility management entity remains connected to the second user equipment, performing the switchover of the connection for the first user equipment to connect to the different first service type mobility management entity at the different location while maintaining the connection between the second service type mobility management entity and the second user equipment to allow the second service type mobility management entity at the location to connect to new second user equipment.

Supplemental Note 15

In some embodiments, the method of any of the Supplemental Notes 10-14 further includes in response to a determination that the first and second service type mobility management entities at the location fail to connect to the first and second user equipment, respectively, in response to determining that one of the first or second service type mobility management entities becomes connectable, performing a switchover of a connection for one of the first or second user equipment to connect to said one of the first service type mobility management entity or the second service type mobility management entity.

Supplemental Note 16

In some embodiments, the method of any of the Supplemental Notes 10-15 further includes in response to a determination that the first and second service type mobility management entities at the location fail to connect to the first and second user equipment, respectively, in response to determining that the first service type mobility management entity becomes connectable and the second service type mobility management entity still fails to connect to the second user equipment, performing a switchover of a connection for the first user equipment to connect to the first service type mobility management entity while maintaining the connection between the different second service type mobility management entity at the different location and the second user equipment to allow the different second service type mobility management entity at the different location to connect to new second user equipment.

Supplemental Note 17

In some embodiments, the first service type mobility management entity of any of the Supplemental Notes 10-16 is configured to handle the first predetermined service only, the first predetermined service including a wideband network service.

Supplemental Note 18

In some embodiments, the second service type mobility management entity of any of the Supplemental Notes 10-17 is configured to handle the second predetermined service only, the second predetermined service including a narrowband network service.

Supplemental Note 19

In some embodiments, the method of any of the Supplemental Notes 10-18 further includes selecting the first service type mobility management entity to connect to the first user equipment while selecting the different second service type mobility management entity at the different location to connect to the second user equipment.

Supplemental Note 20

An aspect of this description relates to a non-transitory computer readable medium configured to store instructions for causing a processor executing the instructions to implement a method. The instructions cause the processor to configure a first service type mobility management entity corresponding to a first predetermined service at a location, the first service type mobility management entity connectable to first user equipment subscribed for the first predetermined service. The instructions further cause the processor to configure a second service type mobility management entity corresponding to a second predetermined service different from the first predetermined service at the location, the second service type mobility management entity connectable to second user equipment subscribed for the second predetermined service. The instructions further cause the processor to perform, in response to determining that the first service type mobility management entity fails to connect to the first user equipment, a switchover of a connection for the first user equipment to connect to a different first service type mobility management entity at a different location.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a non-transitory computer readable medium configured to store instructions thereon; and
a processor connected to the non-transitory computer readable medium, wherein the processor is configured to execute the instructions for:
configuring a first service type mobility management entity corresponding to a first predetermined service at a location, the first service type mobility management entity connectable to first user equipment subscribed for the first predetermined service;
configuring a second service type mobility management entity corresponding to a second predetermined service different from the first predetermined service at the location, the second service type mobility management entity connectable to second user equipment subscribed for the second predetermined service; and
performing, in response to determining that the first service type mobility management entity fails to connect to the first user equipment, a switchover of a connection for the first user equipment to connect to a different first service type mobility management entity at a different location,
wherein
the processor is configured to execute the instructions for:
in response to determining that the first and second service type mobility management entities fail to connect to the first and second user equipment, respectively,
performing the switchover of the connection for the first user equipment to connect to the different first service type mobility management entity at the different location, and performing a second switchover of a connection for the second user equipment to connect to a different second service type mobility management entity at the different location, or
the processor is configured to execute the instructions for:
in response to determining that the first service type mobility management entity fails to connect to the first user equipment and receiving a request of connecting new first user equipment subscribed for the first predetermined service, selecting the different first service type mobility management entity at the different location to connect to the new first user equipment, or
the processor is configured to execute the instructions for:
in response to determining that the first service type mobility management entity fails to connect to the first user equipment and the second service type mobility management entity remains connected to the second user equipment, performing the switchover of the connection for the first user equipment to connect to the different first service type mobility management entity at the different location while maintaining the connection between the second service type mobility management entity and the second user equipment to allow the second service type mobility management entity at the location to connect to new second user equipment, or
in response to a determination that the first and second service type mobility management entities at the location fail to connect to the first and second user equipment, respectively, the processor is configured to execute the instructions for: in response to determining that one of the first or second service type mobility management entities becomes connectable, performing a switchover of a connection for one of the first or second user equipment to connect to said one of the first service type mobility management entity or the second service type mobility management entity.

2. The system of claim 1, wherein
the processor is configured to execute the instructions for:
in response to determining that the first and second service type mobility management entities fail to connect to the first and second user equipment, respectively,
performing the switchover of the connection for the first user equipment to connect to the different first service type mobility management entity at the different location, and
performing the second switchover of the connection for the second user equipment to connect to the different second service type mobility management entity at the different location, and
in response to determining that the first and second service type mobility management entities at the location fail to connect to the first and second user equipment, respectively, the processor is configured to execute the instructions for:
in response to determining that the first service type mobility management entity becomes connectable and the second service type mobility management entity still fails to connect to the second user equipment, performing a switchover of a connection for the first user equipment to connect to the first service type mobility management entity while maintaining the connection between the different second service type mobility management entity at the different location and the second user equipment to allow the different second service type mobility management entity at the different location to connect to new second user equipment.

3. The system of claim 1, wherein the first service type mobility management entity is configured to handle the first predetermined service only, the first predetermined service including a wideband network service.

4. The system of claim 1, wherein the second service type mobility management entity is configured to handle the second predetermined service only, the second predetermined service including a narrowband network service.

5. The system of claim 1, wherein the processor is configured to execute the instructions for instructing a transmitter to transmit a result of the switchover to an external device.

6. The system of claim 1, wherein the processor is configured to execute the instructions for selecting the first service type mobility management entity to connect to the first user equipment while selecting the different second service type mobility management entity at the different location to connect to the second user equipment.

7. A method, comprising:

configuring a first service type mobility management entity corresponding to a first predetermined service at a location, the first service type mobility management entity connectable to first user equipment subscribed for the first predetermined service;

configuring a second service type mobility management entity corresponding to a second predetermined service different from the first predetermined service at the location, the second service type mobility management entity connectable to second user equipment subscribed for the second predetermined service; and performing, in response to determining that the first service type mobility management entity fails to connect to the first user equipment, a switchover of a connection for the first user equipment to connect to a different first service type mobility management entity at a different location, wherein the method further comprises:

in response to determining that the first and second service type mobility management entities fail to connect to the first and second user equipment, respectively, performing the switchover of the connection for the first user equipment to connect to the different first service type mobility management entity at the different location, and performing a second switchover of a connection for the second user equipment to connect to a different second service type mobility management entity at the different location, or in response to determining that the first service type mobility management entity fails to connect to the first user equipment and receiving a request of connecting new first user equipment subscribed for the first predetermined service, selecting the different first service type mobility management entity at the different location to connect to the new first user equipment, or in response to determining that the first service type mobility management entity fails to connect to the first user equipment and the second service type mobility management entity remains connected to the second user equipment, performing the switchover of the connection for the first user equipment to connect to the different first service type mobility management entity at the different location while maintaining the connection between the second service type mobility management entity and the second user equipment to allow the second service type mobility management entity at the location to connect to new second user equipment, or in response to a determination that the first and second service type mobility management entities at the location fail to connect to the first and second user equipment, respectively, and in response to determining that one of the first or second service type mobility management entities becomes connectable, performing a switchover of a connection for one of the first or second user equipment to connect to said one of the first service type mobility management entity or the second service type mobility management entity.

8. The method of claim 7, further comprising:

in response to determining that the first and second service type mobility management entities fail to connect to the first and second user equipment, respectively, performing the switchover of the connection for the first user equipment to connect to the different first service type mobility management entity at the different location, and performing the second switchover of the connection for the second user equipment to connect to the different second service type mobility management entity at the different location; and in response to determining that the first and second service type mobility management entities at the location fail to connect to the first and second user equipment, respectively, in response to determining that the first service type mobility management entity becomes connectable and the second service type mobility management entity still fails to connect to the second user equipment, performing a switchover of a connection for the first user equipment to connect to the first service type mobility management entity while maintaining the connection between the different second service type mobility management entity at the different location and the second user equipment to allow the different second service type mobility management entity at the different location to connect to new second user equipment.

9. The method of claim 7, wherein the first service type mobility management entity is configured to handle the first predetermined service only, the first predetermined service including a wideband network service.

10. The method of claim 7, wherein the second service type mobility management entity is configured to handle the second predetermined service only, the second predetermined service including a narrowband network service.

11. The method of claim 7, further comprising: selecting the first service type mobility management entity to connect to the first user equipment while selecting the different second service type mobility management entity at the different location to connect to the second user equipment.

12. A non-transitory computer readable medium configured to store instructions for causing a processor executing the instructions to implement a method comprising:

configuring a first service type mobility management entity corresponding to a first predetermined service at a location, the first service type mobility management entity connectable to first user equipment subscribed for the first predetermined service;

configuring a second service type mobility management entity corresponding to a second predetermined service different from the first predetermined service at the location, the second service type mobility management entity connectable to second user equipment subscribed for the second predetermined service; and performing, in response to determining that the first service type mobility management entity fails to connect to the first user equipment, a switchover of a connection for the first user equipment to connect to a different first service type mobility management entity at a different location, wherein the method further comprises:

in response to determining that the first and second service type mobility management entities fail to connect to the first and second user equipment, respectively, performing the switchover of the connection for the first user equipment to connect to the different first service type mobility management entity at the different location, and performing a second switchover of a connection for the second user equipment to connect to a different second service type mobility management entity at the different location, or in response to determining that the first service type mobility management entity fails to connect to the first user equipment and receiving a request of connecting new first user equipment subscribed for the first predetermined service, selecting the different first service type mobility management entity at the different location to connect to the new first user equipment, or in response to determining that the first service type mobility management entity fails to connect to the first user equipment and the second service type mobility management entity remains connected to the second user equipment, performing the switchover of the connection for the first user equipment to connect to the different first service type mobility management entity at the different location while maintaining the connection between the second service type mobility management entity and the second user equipment to allow the second service type mobility management entity at the location to connect to new second user equipment, or in response to a determination that the first and second service type mobility management entities at the location fail to connect to the first and second user equipment, respectively, and in response to determining that one of the first or second service type mobility management entities becomes connectable, performing a switchover of a connection for one of the first or second user equipment to connect to said one of the first service type mobility management entity or the second service type mobility management entity.

* * * * *